(12) United States Patent
Ryan

(10) Patent No.: US 9,864,380 B1
(45) Date of Patent: Jan. 9, 2018

(54) FORMATION FLIGHT SYSTEM EXTREMUM-SEEKING-CONTROL USING BLENDED PERFORMANCE PARAMETERS

(71) Applicant: The United States of America as Represented by the Administrator of NASA, Washington, DC (US)

(72) Inventor: John J. Ryan, Tehachapi, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/215,776

(22) Filed: Jul. 21, 2016

Related U.S. Application Data

(60) Provisional application No. 62/196,039, filed on Jul. 23, 2015.

(51) Int. Cl.
*G05D 1/00* (2006.01)
*G05D 1/10* (2006.01)

(52) U.S. Cl.
CPC ........... *G05D 1/104* (2013.01); *G05D 1/0005* (2013.01)

(58) Field of Classification Search
CPC .............................. G05D 1/104; G05D 1/0005
USPC ............................................................ 701/4
See application file for complete search history.

(56) References Cited

U.S. PATENT DOCUMENTS

| | | | |
|---|---|---|---|
| 7,203,555 B2 | 4/2007 | Ogunnaike et al. | |
| 9,150,311 B2 * | 10/2015 | Rix | B64D 39/00 |
| 2007/0068373 A1 * | 3/2007 | McCantas, Jr. | B64D 1/04 |
| | | | 89/1.11 |
| 2013/0062457 A1 * | 3/2013 | Deakin | B64B 1/08 |
| | | | 244/25 |
| 2013/0168497 A1 * | 7/2013 | Rix | B64D 39/00 |
| | | | 244/135 A |
| 2014/0214243 A1 * | 7/2014 | Whitehead | G05D 1/104 |
| | | | 701/3 |

(Continued)

OTHER PUBLICATIONS

D. F. Chichka, J. L. Speyer, C. L. Fanti, and C-G Park, "Peak-Seeking Control for Drag Reduction in Formation Flight", AIAA Journal of Guidance, Control, and Dynamics, v. 29, No. 5, Sep.-Oct. 2006, pp. 1221-1230.

(Continued)

*Primary Examiner* — Atul Trivedi
(74) *Attorney, Agent, or Firm* — Mark Homer

(57) ABSTRACT

An extremum-seeking control system for formation flight that uses blended performance parameters in a conglomerate performance function that better approximates drag reduction than performance functions formed from individual measurements. Generally, a variety of different measurements are taken and fed to a control system, the measurements are weighted, and are then subjected to a peak-seeking control algorithm. As measurements are continually taken, the aircraft will be guided to a relative position which optimizes the drag reduction of the formation. Two embodiments are discussed. Two approaches are shown for determining relative weightings: "a priori" by which they are qualitatively determined (by minimizing the error between the conglomerate function and the drag reduction function), and by periodically updating the weightings as the formation evolves.

14 Claims, 9 Drawing Sheets

(56) References Cited

U.S. PATENT DOCUMENTS

| | | | | |
|---|---|---|---|---|
| 2015/0197335 | A1* | 7/2015 | Dekel | B64C 29/0033 701/5 |
| 2015/0379408 | A1* | 12/2015 | Kapoor | G01W 1/10 706/46 |
| 2017/0036709 | A1* | 2/2017 | Metka | B62D 35/001 |
| 2017/0113799 | A1* | 4/2017 | Kovac | B64C 39/024 |

OTHER PUBLICATIONS

Lavretsky, E., Hovakimyan, N.; Calise, A. & Stepanyan, V., "Adaptive Vortex Seeking Formation Flight Neurocontrol in AIAA Guidance", Navigation and Control Conference and Exhibit, 11-14 (2003).

Binetti, P., Ariyur, K. B.; Krstic, M. & Bernelli, "Flight Formation and Flight Optimization Using Extremum Seeking Feedback", Journal of Guidance, Control, and Dynamics, 26, 132-142 (2003).

Curtis E. Hanson, "A Fuzzy Technique for Performing Lateral-Axis Formation Flight Navigation Using Wingtip Vortices." Technical Report NASA/TM-2003-212033, NASA Dryden Flight Research Center, Edwards, California, 2003.

M. A. Rotea, "Analysis of Multivariable Extremum Seeking Algorithms", Proc. of the American Control Conference, pp. 433-0437 (2000).

G. C. Walsh, "On the Application of Multi-Parameter Extremum Seeking Control", Proc. of the American Control Conference, pp. 411-415 (2000).

Kartik B. Ariyur and Miroslav Krstic, "Multivariable Extremum Seeking Feedback: Analysis and Design", American Control Conference (2002).

Masoud Zarepisheh, Adres F. Uribe-Sanchez, Nan Li, Xun Jia, and Steve B Jiang, "A Multi-Criteria Framework with Voxel-Dependent Parameters for Radiotherapy Treatment Plan Optimization", Center for Advanced Radiotherapy Technologies and Department of Radiation Medicine and Applied Sciences, University of California San Diego, La Jolla (2012).

M. Beukenberg and D. Hummel, "Aerodynamics, performance and control of air-planes in formation flight," in Proceedings of the 17th Congress of the International Council of the Aeronautical Sciences. ICAS-90-5.9.3. Sep. 9-14, 1990.

S. A. Ning, T. C. Flanzer, and I. M. Kroo, "Aerodynamic performance of extended formation flight" in 48th AIAA Aerospace Sciences Meeting Including the New Horizons Forum and Aerospace Exposition, AIAA, Orlando, Florida AIAA, Jan. 2010.

G. C. Bower, T. C. Flanzer, and I. M. Kroo, "Formation geometries and route optimization for commercial formation flight," in 27th AIAA Applied Aerodynamics Conference, San Antonio, Texas, Jun. 2009.

M.J. Vachon, R. J. Ray, K. R. Walsh, and K. Ennix, "F\A-18 aircraft performance benefits measured during the autonomous formation flight project," AIAA Guidance, Navigation and Control Conference, 2002.

J. J. Ryan and J. L. Speyer, "Peak-Seeking Control Using Gradient and Hessian Estimates," in Proceedings of the American Control Conference., Baltimore, MD: ACC, Jun. 2010, pp. 611-616.

\* cited by examiner

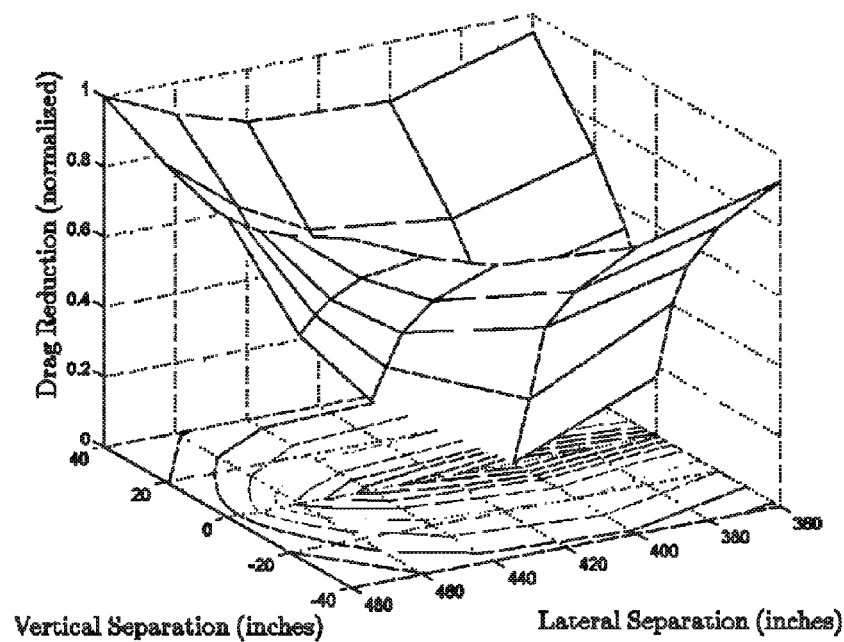
FIG. 3(a) Normalized Drag Reduction
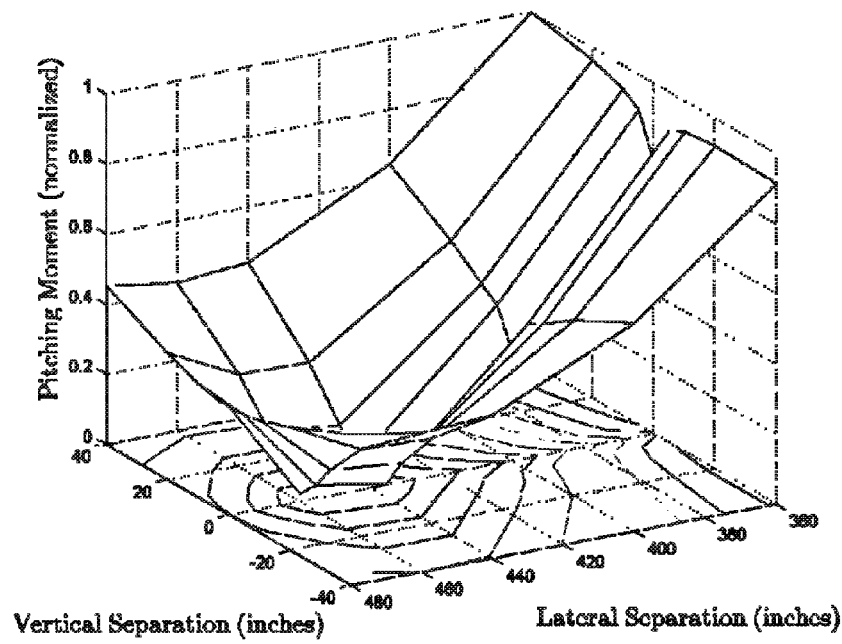
FIG. 3(c) Normalized Pitching Moment

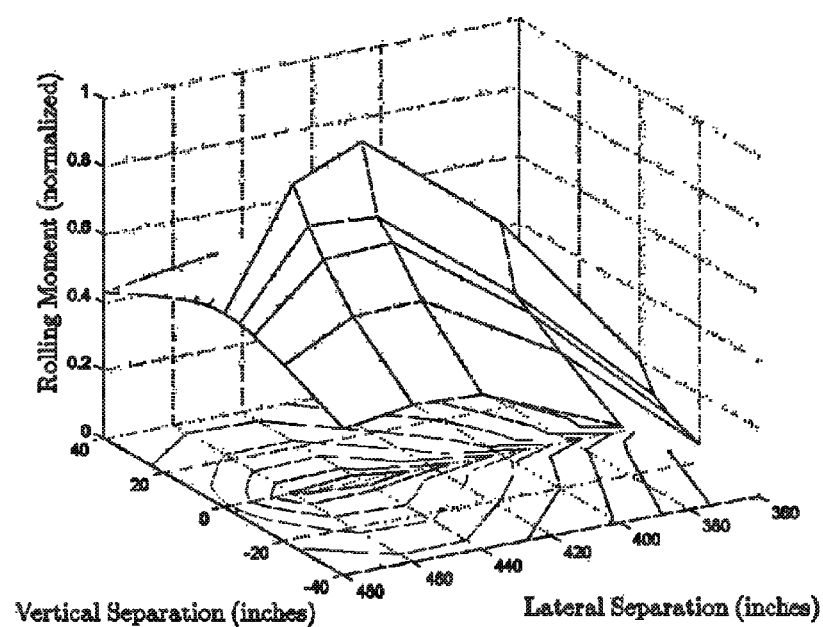
FIG. 3(b) Normalized Rolling Moment
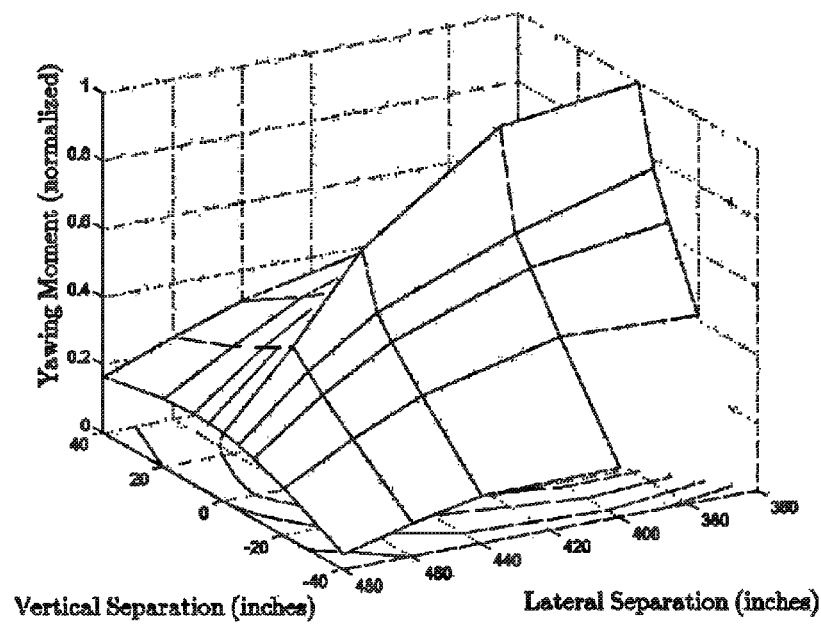
FIG. 3(d) Normalized Yawing Moment

FORMATION FLIGHT SYSTEM EXTREMUM-SEEKING-CONTROL USING BLENDED PERFORMANCE PARAMETERS

CROSS-REFERENCE TO RELATED APPLICATIONS

The present application derives priority from U.S. provisional patent application Ser. No. 62/196,039 filed on 23 Jul. 2015.

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND a. Field of invention

The invention relates to aircraft control systems and, more particularly, to a system and method for extremum-seeking-control for formation flight using blended and weighted performance parameters to optimize the conglomerate drag reduction function.

b. Background of the invention

Formation-flight-for-drag-reduction provides significant fuel savings for a formation of aircraft, and is an active area of research. See, e.g., M. Beukenberg and D. Hummel, "Aerodynamics, performance and control of air-planes in formation flight," in Proceedings of the 17th Congress of the International Council of the Aeronautical Sciences. ICAS-90-5.9.3, September 9-14 1990; S. A. Ning, T. C. Flanzer, and I. M. Kroo, "Aerodynamic performance of extended formation flight," in 48th AIAA Aerospace Sciences Meeting Including the New Horizons Forum and Aerospace Exposition, AIAA, Orlando, Fla.: AIAA, January 2010; G. C. Bower, T. C. Flanzer, and I. M. Kroo, "Formation geometries and route optimization for commercial formation flight," in 27th AIAA Applied Aerodynamics Conference, San Antonio, Tex., June 2009; M. J. Vachon, R. J. Ray, K. R. Walsh, and K. Ennix, "F\A-18 aircraft performance benefits measured during the autonomous formation flight project," AIAA Guidance, Navigation and Control Conference, 2002.

In a formation of two aircraft, the trailing aircraft is positioned such that its wing span resides in the up-wash created by the wake vortices of the leading aircraft. This is typically realized with the trailing aircraft's wing-tip residing near the core of the leading aircraft's inboard wake vortex. Due to the asymmetric nature of the wake vortex, asymmetric aerodynamic forces act on the trailing aircraft. These forces result in effects such as an induced rolling moment, pitching moment, and yawing moment on the trailing aircraft. Effects on the leading aircraft are typically negligible. The strength of these effects depends upon the relative position of the aircraft in the formation.

Some drag reduction solutions submit a priori information about time-varying parameters to a software model, but these cannot work in applications where a priori information does not exist or is not timely available. Under such circumstances, a non-model-based "extremum seeking" or "peak-seeking" control schema is a more practical approach. Peak-seeking controllers use measurements of input and output signals and dynamically maximize or minimize a function, and do not require a priori model. Peak-seeking control is very accurate because it uses the current flight data to find the optimum, and not just theoretical or empirical models with uncertainties. Examples of automatic control systems intended to realize formation-flight-for-drag-reduction that employ an extremum seeking control system to optimize the drag reduction benefits include: J. J. Ryan and J. L. Speyer, "Peak-Seeking Control Using Gradient And Hessian Estimates," in Proceedings of the American Control Conference, Baltimore, Md.: ACC, June 2010, pp. 611-616; D. Chichka, J. Speyer, C. Fanti, and C. Park, "Peak-Seeking Control For Drag Reduction In Formation Flight," J. Guid. Control Dyn., vol. 29, no. 5, pp. 1221-1230, September-October 2006; and P. Binetti, K. B. Ariyur, M. Krstic; F. Bernelli, "Formation flight optimization using extremum seeking feedback," Journal Of Guidance, Control, And Dynamics, vol. 26, pp. 132-142, 2003; and E. Lavretsky, N. Hovakimyan, A. Calise, and V. Stepanyan, "Adaptive Vortex Seeking Formation Flight Neurocontrol," in AIAA Guidance, Navigation, and Control Conference and Exhibit, Austin, Tex., 2003, pp. 11-14. Each of these systems estimates the local gradient of a performance function and commands the trailing aircraft of the formation to a relative position which minimizes the gradient of the performance function.

Ideally, such a formation flight control system would employ a performance function formed from measurements of drag-reduction thereby directly maximizing the drag reduction achieved during flight. Unfortunately drag-reduction is not directly measurable and difficult to estimate. Conventional approaches side-step this issue by extremizing performance functions formed from measurements analogous to drag-reduction. For example Lavretsky et al. minimize throttle activity, Chichka et al. maximizes the induced rolling moment, and Binetti et al. maximizes the induced pitch angle. With each of these approaches, the extremum seeking control system improves the drag reduction achieved; however, the true drag reduction extremum coordinates do not necessarily coincide with that of the analogous measurement.

What is needed is an extremum-seeking control system for formation flight that uses blended performance parameters in a conglomerate performance function that better approximates drag reduction than performance functions formed from individual measurements.

SUMMARY OF THE INVENTION

It is, therefore, an object of the present invention to provide a control system for formation-flight drag-reduction that combines readily available measurements to form a blended performance function that more closely approximates drag reduction.

It is another object to provide an extremum-seeking control system for formation flight that uses blended performance parameters in a weighted performance function to better approximate drag reduction than performance functions formed from individual measurements.

It is another object to provide two methods of constructing weighting vectors for the above-decribed performance functions: the first method using a priori measurements to determine a weighting vector and the second periodically updating the weighting vector by fitting elemental functions to measurements of fuel-flow.

According to the present invention, the above-described and other objects are accomplished by providing an extremum-seeking control system for formation flight that uses blended performance parameters in a conglomerate performance function that better approximates drag reduction than performance functions formed from individual measurements. Generally, a variety of different measurements are taken and fed to a control system, the measurements are weighted and are then subjected to a peak-seeking control algorithm. As measurements are continually taken, the aircraft will be guided to a relative position which optimizes the drag reduction of the formation. Two weighting approaches are discussed.

The first combines measurements of readily available parameters such as rolling-moment, pitching-moment, yawing-moment, power lever angle (or rate of change of power level angle), and fuel consumption, to approximate the shape of an a priori measured (or estimated) drag reduction function (any other suitable group of appropriate real-time measurements can be used). The measurements are weighted by relative weightings that were qualitatively determined (by minimizing the error between the conglomerate function and the drag reduction function). Optimization is then achieved using a generalized least squares approach to form a linear combination of the measurements, though other suitable optimization approach(es) may be used to form linear or nonlinear combinations of the measurements.

The second builds on the first, and additionally periodically updates the weightings as the formation evolves. Given a quantitative model upon which the weightings for the measurements are determined, a slow measurement such as a fuel-flow measurement is used to determine optimal weightings, and the weightings are periodically updated.

In both cases as measurements are continually taken the aircraft will be guided to a relative position which optimizes the drag reduction of the formation.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

FIG. 3 is a composite of graphs, FIG. 3(a) showing normalized drag reduction; FIG. 3(b) shows rolling moment; FIG. 3(c) shows pitching moment; and FIG. 3(d) shows yawing moment data used to construct a blended performance function.

FIG. 4 shows two graphs representing the blended performance function and extremum locations of drag reduction, rolling moment, pitching moment, yawing moment, and blended function.

FIG. 5 is a composite of contour plots of performance functions and their parabolic fitted performance functions.

DETAILED DESCRIPTION OF THE PREFERRED EMBODIMENT

The present invention is a hardware and software architecture that an extremum-seeking control system for formation flight that uses blended performance parameters in a conglomerate performance function that better approximates drag reduction than performance functions formed from individual measurements.

The following is a list of nomenclature used throughout the description of the preferred embodiment:

$\hat{w}$ Optimal weighting vector
B Blended performance function
F Fuel flow
Y Matrix of induced rolling, pitching, and yawing moments
$\mathbb{R}$ Set of real numbers
$A_{(\cdot)}$ Quadratic coefficients of an elliptic paraboloid
$b_{(\cdot)}$ Linear coefficients of an elliptic paraboloid
D Induced drag reduction
i Index of summation
L Induced rolling moment
M Induced pitching moment
N Induced yawing moment
n Number of aircraft in a formation
V Nonsingular weighting factor
w A weighting vector
X Discrete set of relative positions between aircraft
x Relative position between aircraft In accordance with the invention, described herein is an enabling control architecture and two computerized methods of extremum-seeking control for formation flight that uses blended performance parameters in a conglomerate performance function that better approximates drag reduction than performance functions formed from individual measurements.

Figure 1:
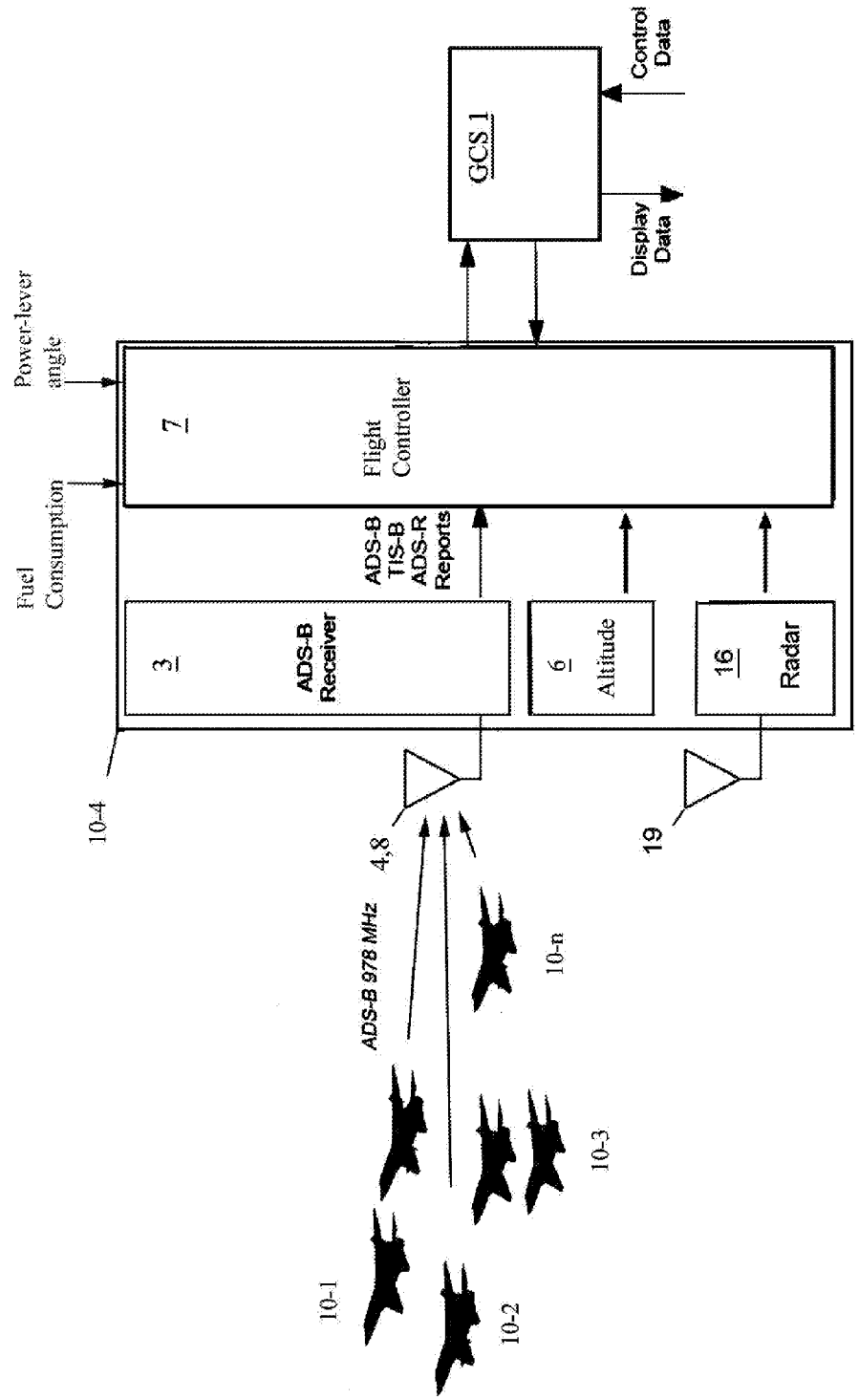
FIG. 1 is a block diagram of an exemplary system architecture.

FIG. 1 is a block diagram of an exemplary system architecture in which a plurality of aircraft 10-1 . . . n are in wireless communication with themselves and with a ground control station (GCS) 1. Within an exemplary one of the aircraft 10-4, the in-vehicle architecture includes an ADS-B Universal Access Transceiver (UAT) 3 mounted in the aircraft 10-4, and connected to a top-mounted antenna 4, a top-mounted GPS/WAAS antenna 5, a bottom-mounted antenna 8, radar 16 with radar antenna(s) 19, and a sensor array inclusive of an altitude encoder 6, and a three axis-accelerometer 17 for real-time measurements of rolling-moment, pitching-moment, and yawing-moment. In addition, as will become apparent, the present system may optionally rely on measured parameters from the aircraft's pre-existing instrumentation, and particularly fuel consumption as shown at top and power-lever angle or rate-of-change of power level angle. In conventional aircraft a pilot controls engine power by varying the position or angle of a throttle lever, and the angle of the throttle lever as well as the rate of change of throttle lever angle is determinative of the amount of power supplied by the engine. Signals indicative of these parameters are provided to the existing flight controller whereby the power lever angle and the rate of change of power lever angle can be readily determined.

The aircraft 10-4 is also equipped with an existing flight control computer 7 in communication with the UAT 3. One skilled in the art will undererstand that the flight controller 7 may be a standalone computer component or part of a more extensive integrated modular avionics (IMA) architecture. The flight controller 7 is provided with a generic payload communication interface which includes a wireless (RF) telemetry datalink via Telemetry antenna 9 to GCS 1 for control of the aircraft 10-4 via its autopilot and/or sense-and-avoid software, as well as for control of the mission payload(s). The flight control computer 7 is always transmitting for ADS-B operations and is the primary method of ADS-B and Radar transmission of data used herein. GCS 1 and associated ground control equipment (to be described) allows an operator to interactively control both the mission payload functions as well as the control functions of the aircraft 10-4.

UAT 3 is a conventional dual band 978 and/or 1090 Mhz ADS-B transceiver with a built-in 15 channel GPS/WAAS receiver, preferably certified to support a broad array of Automatic Dependent Surveillance-Broadcast (ADS-B) broadband services and factory-configured to broadcast ownship position, velocity, projected track, altitude, and flight identification via RF communications (an RF data link on 978 MHz or 1090 Mhz) to other ADS-B equipped aircraft in the formation, as well as to GCS 1 and other ground-based transceivers. The UAT 3 may also provide other ancillary functions, including storage and retrieval of aircraft configuration data as will be described. GPS/WAAS antenna 5 is connected to the UAT 3 built-in 15 channel GPS/WAAS receiver. UAT antennas 4, 8 and GPS/WAAS antenna 5 are conventional components. The altitude encoder 6 is also a conventional component that produces digitized pressure information for determining the aircraft 10-4 pressure altitude. The radar device 16 is preferably a conventional multi-mode radar sensor that combines high quality radar performance and flexible system characteristics. Radar device 16 is connected to radar antenna(s) 19, which are/is a conventional omnidirectional radar antenna and directional receiving antennas.

The UAT 3 is inherently capable of ADS-B Out broadcasts of ownship ADS-B data. For this, the UAT 3 determines the UAS ownship position/velocity from a built-in GPS/WAAS receiver. The Flight Controller 7 inputs pressure/altitude from altitude encoder 6 to broadcast ownship pressure altitude information, as well as rolling-moment, pitching-moment, and yawing-moment from three axis-accelerometer 17, and power-lever angle (or rate-of-change of power level angle) plus fuel consumption from the aircraft's pre-existing instrumentation.

The upper and lower UAT antennas 4, 8 provide line-of-sight transmission and reception of ADS-B broadcasts. The UAT 3 also receives a system maintenance input as required for the configuration and maintenance of the ADS-B system, and also receives input from the Ground Control Station (GCS) 1.

In accordance with the invention, the flight controller 7 includes resident non-transitory storage media and transitory storage media. The non-transitory storage media stores the extremum-seeking control software 12 for maintaining formation 10-1 . . . n that uses blended performance parameters in accordance with the invention. The extremum-seeking control software 12 assimilates a number of linearly combined parameters available in real-time measurements, weights them, and applies an extremum-seeking performance function. The extremum of this blended performance function better approximates the minimum of the drag-reduction performance function than other prior art performance functions formed from single parameters. Two weighting options for the blended performance function are herein disclosed to solve the formation-flight-for-drag-reduction problem: 1) an a priori weighing method and 2) a second method in which a weighting vector is updated over time.

Figure 2:
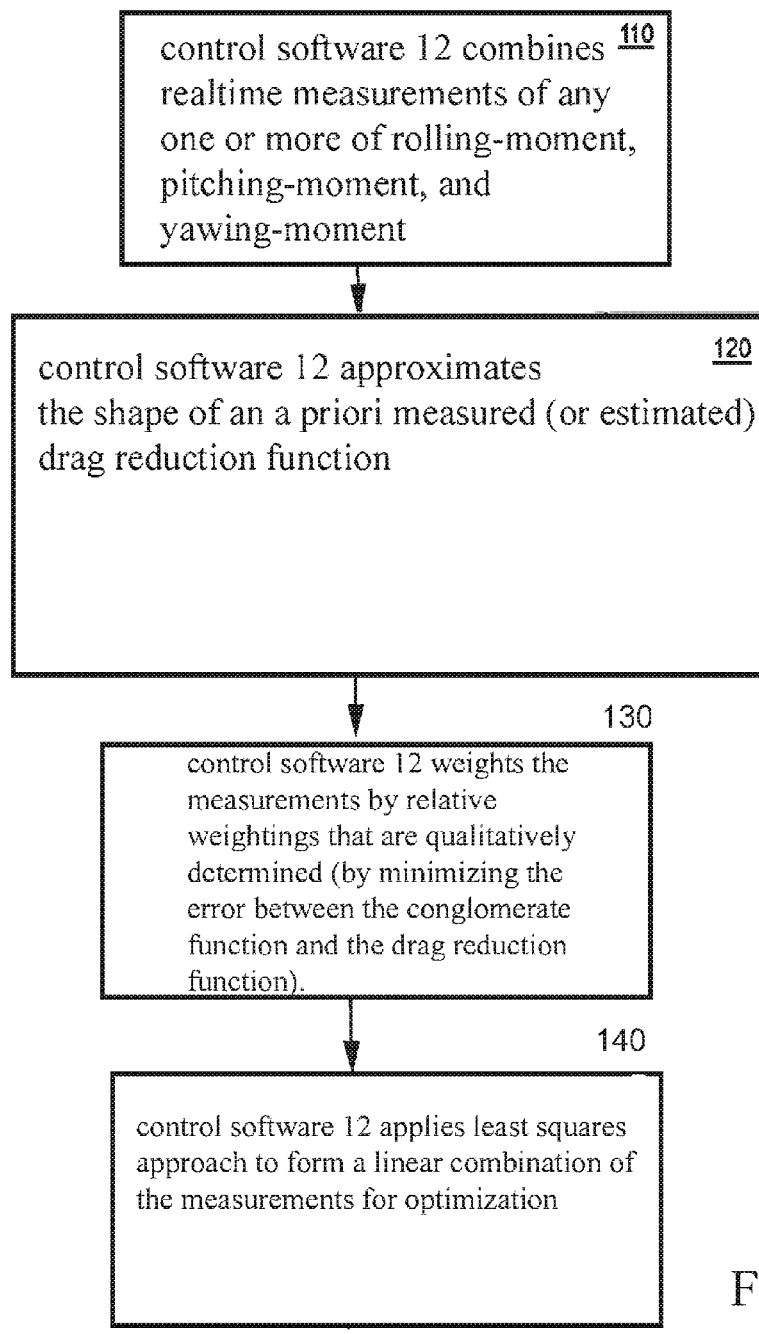
FIG. 2 is a stepwise block diagram of the general software method of the invention.

FIG. 2 is a stepwise block diagram of the general software method of the invention. At step 110, extremum-seeking control software 12 combines realtime measurements of readily available parameters including rolling-moment, pitching-moment, yawing-moment and, optionally, fuel consumption.

At step 120, extremum-seeking control software 12 approximates the shape of an a priori measured (or estimated) drag reduction function.

At step 130, extremum-seeking control software 12 weights the measurements by relative weightings that are qualitatively determined (by minimizing the error between the conglomerate function and the drag reduction function). The relative weightings are derived by one of two methods described in detail below.

At step 140, extremum-seeking control software 12 uses a generalized least squares approach to form a linear combination of the measurements to optimize the function, though other suitable optimization approach(es) may be used to form linear or nonlinear combinations of the measurements.

The software 12 comprises computer instructions that implement a mathematic construct as follows.

First software 12 defines mappings of relative position x to induced rolling moment $L \in \mathbb{R}$, induced pitching moment $M \in \mathbb{R}$, induced yawing moment $N \in \mathbb{R}$, and induced drag reduction $D \in \mathbb{R}$ as follows:

$$L: x \to L$$

$$M: x \to M$$

$$N: x \to N$$

$$D: x \to D$$

One skilled in the art will recognize that mappings other than L, M, N, and D can be used as well.

Software 12 then further defines a matrix $Y=[L; M; N] \in \mathbb{R}^{n \times 3}$ and a discrete set, $X \in \mathbb{R}^{n \times 2}$ of n positions between aircraft 10-1 . . . n. It is assumed that matrix Y has full column rank. It is further assumed that discrete set X is chosen such that each mapping is convex. This assumption ensures the blended performance function is convex. The blended performance function is defined as:

$$B = \omega Y(X) \qquad (1)$$

where $\omega$ is a weighting vector. Two embodiments of the weighting method are disclosed.

A. A Priori Weighting Method

A generalized least squares problem is solved to determine $\hat{\omega}$, the optimal weighting which minimizes the error between D(X) and B(X):

$$\hat{\omega} = \arg_\omega \min(D(X) - Y(X)\omega)^T V^{-1}(D(X) - Y(X)\omega). \qquad (2)$$

The restrictions on X ensures a solution to the least squares problem exists. The nonsingular weighting factor V is chosen to ensure the extremum coordinates B closely match the extremum coordinates of D.

The a priori method is applied to a pre-existing dataset, which may be an empirical data set (also known as "a posteriori" data) gathered from past events such as, for example, realtime data derived from sensors on aircraft 10-1 . . . n flying in formation. Alternatively, the pre-existing dataset may be theoretically detrived data from a computational fluid dynamics (CFD) analysis. For purposes of explanation the a priori method was applied to data derived from flight experiments which used two F/A-18 aircraft in formation. Generally, performance functions were derived for each measured parameter using conventional least-squares (model fitting) algorithms, the performance functions are linearly combined in a conglomerate blended performance function with relative weighting factors for each parameter, the realtime data is applied, and the conglomerate performance function is optimized to determine a priori the most accurate weights.

FIG. 3(a-d) collectively depicts normalized drag-reduction, rolling-moment, pitching-moment, and yawing-moment as functions of relative position between aircraft. Rolling moment, pitching moment, and yawing moment depicted in FIGS. 3(b), (c) and (d), respectively, resemble drag reduction depicted in FIG. 3(a). Given performance functions for the rolling-moment of FIG. 3(b), pitching-moment of FIG. 3(c), and yawing-moment of FIG. 3(d) may be estimated using conventional least-squares (model fitting) algorithms such as are available using MATLAB™ or Simulink™ softwares. Each are unimodal with different extremum coordinates. The relative position set X was selected to ensure the functions were convex.

Next, a blended performance function is formed by linearly combining the rolling-moment of FIG. 3(b), pitching-moment of FIG. 3(c), and yawing-moment of FIG. 3(d) performance functions with weights calculated from equation (2). Selecting X to be an 80 by 120 inch area around the extremum and choosing V=D results in the weighting vector:

$$\dot{\omega}=[1.41.1-1.2] \quad (3)$$

Figure 4B:
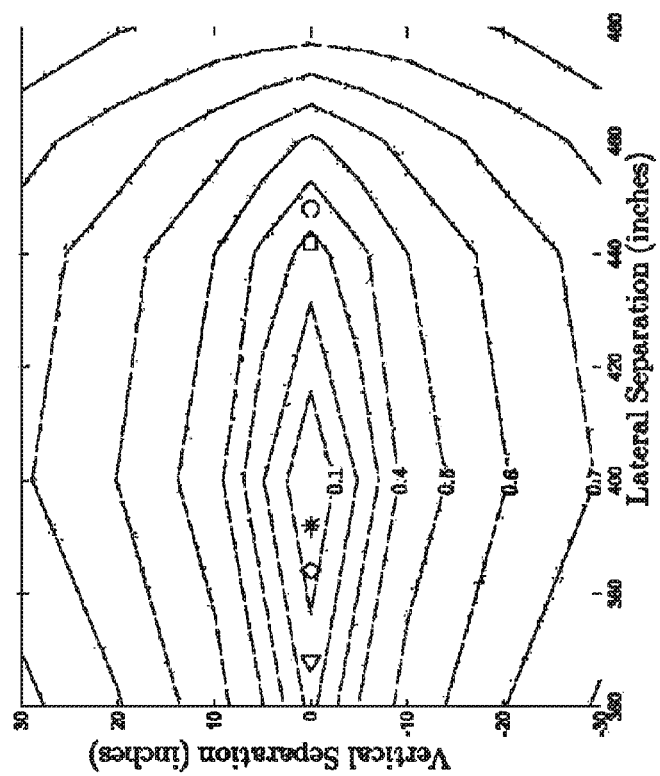
FIG. 4(b) showing blended performance function contour.
Figure 4A:
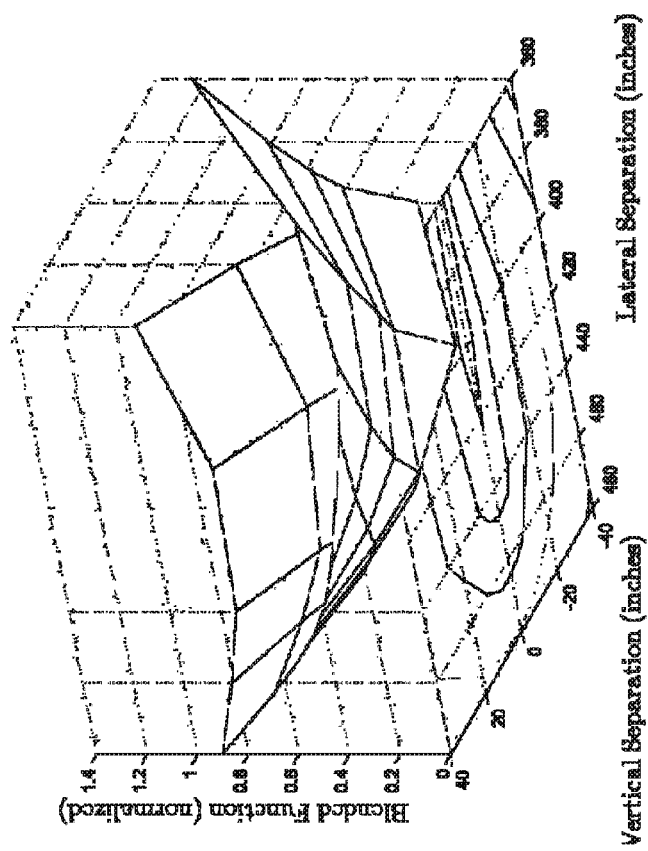
FIG. 4(a) showing blended performance function surface.
Figure 5A:
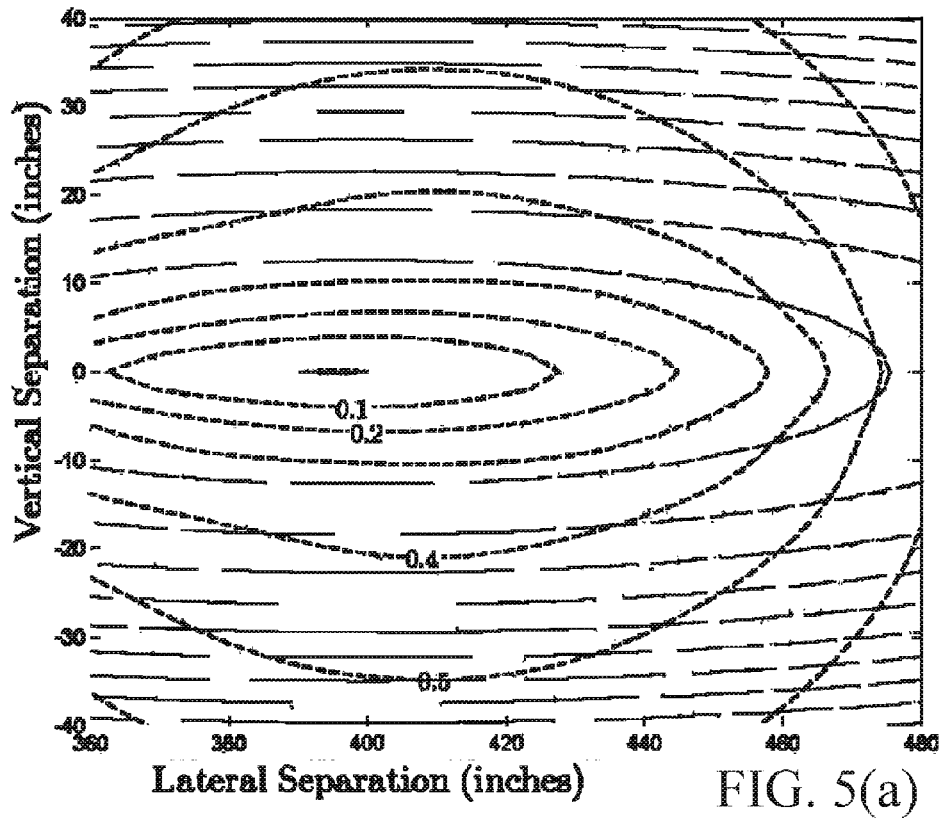
FIG. 5(a) depicts the blended surface.
Figure 5B:
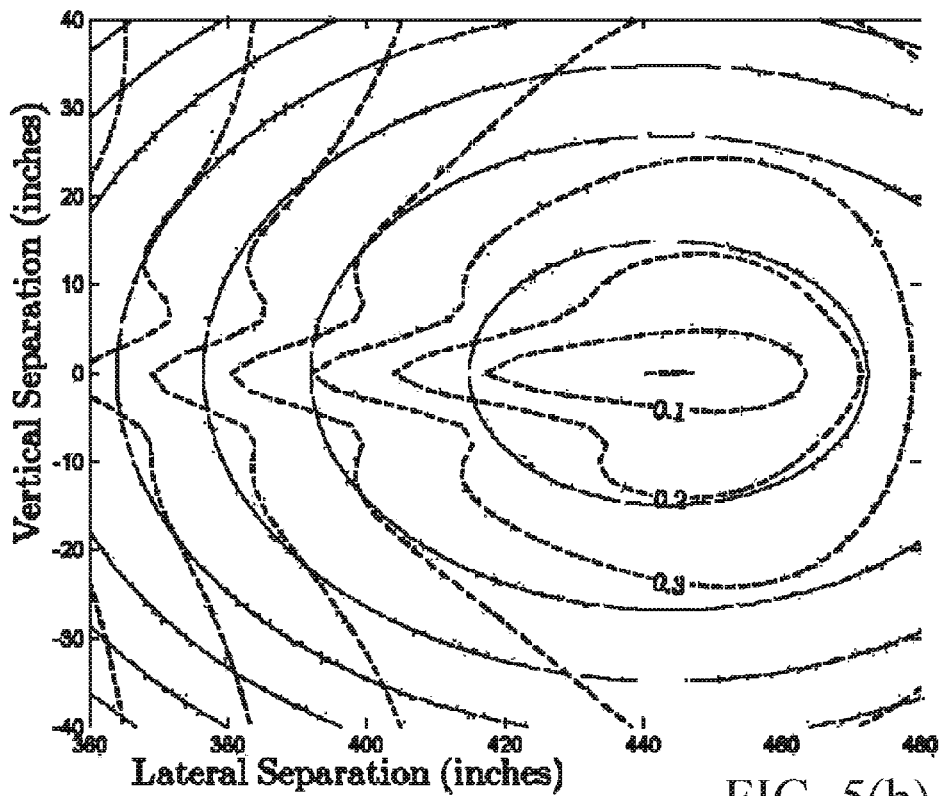
FIG. 5(b) depicts the extrema locations of the drag-reduction, rolling-moment, pitching-moment, yawing-moment, and blended performance functions.
Figure 5C:
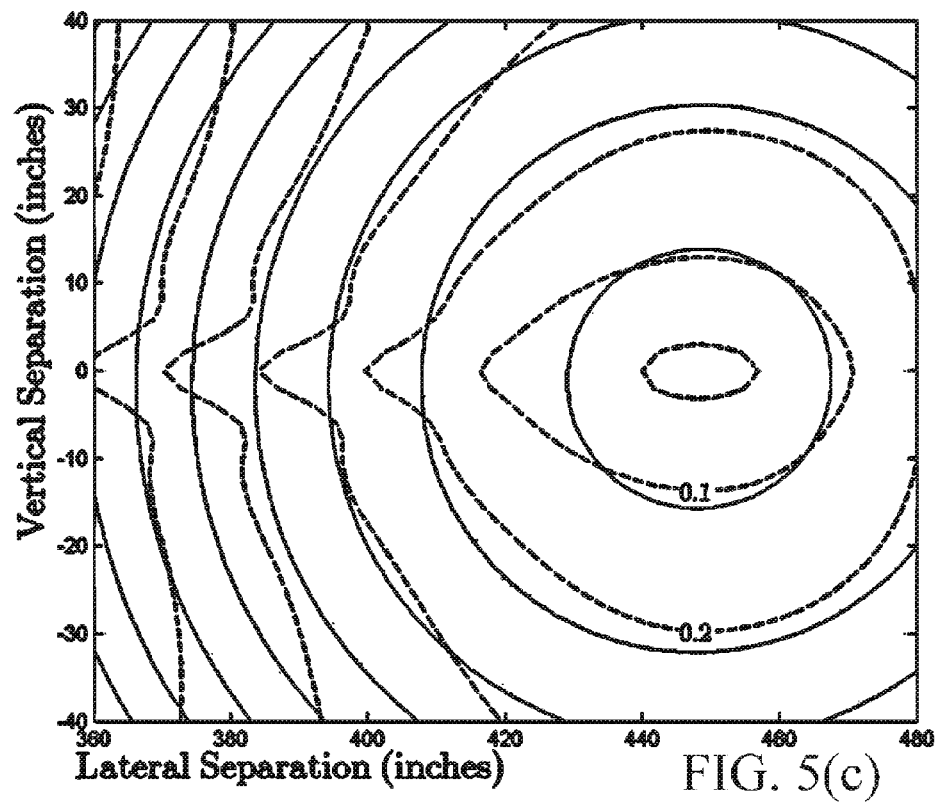
FIG. 5(c) depicts pitching moment performance function.
Figure 5D:
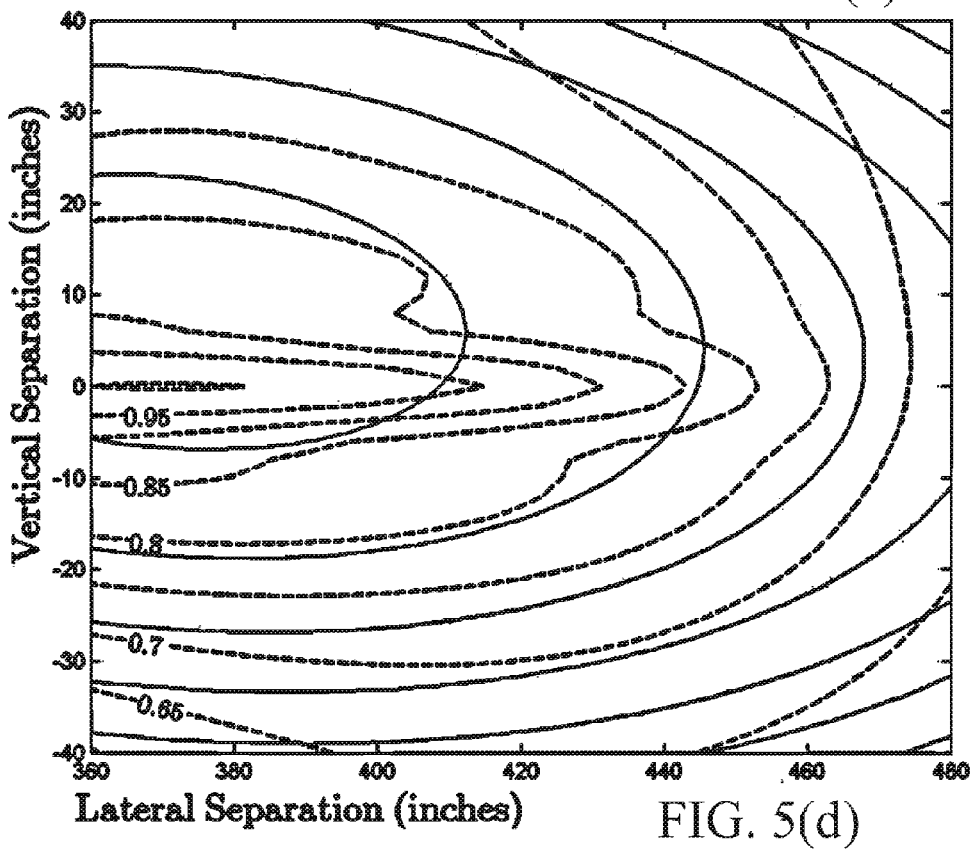
FIG. 5(d) depicts yawing moment performance function.

FIG. 4(a) depicts the blended surface.

FIG. 4(b) depicts the extrema locations of the drag-reduction, rolling-moment, pitching-moment, yawing-moment, and blended performance functions.

It is clear that the blended performance function extremum of FIG. 4(a) is nearer that of drag-reduction of FIG. 3(a) than the other performance functions taken individually.

The main limitation of the a priori weighting method is the restriction to an a priori calculation of ω. If D is not an accurate representation of the actual drag reduction performance then B will not provide a good indication of the extremum coordinates and the optimal drag reduction will not be found. Similarly, if the relationships between L, M, N, and D is not constant over time, then the optimal drag reduction will not be found.

B. Weight Updating Method

The second method of constructing a performance function is an augmentation of the first. It incorporates estimates of D during flight to update the blended performance function B. Since drag reduction is difficult to estimate in real time, fuel flow measurements are used. Unfortunately fuel flow measurements lag behind drag reduction and require a dwell-time to allow the fuel flow to reach a steady state. This slows the convergence of the extremum-seeking control system software 12 to the coordinates of minimum fuel flow. The impact of dwell-time on convergence is reduced by forming a blended performance function as discussed above, but in this case periodically updating the weighting vector when fuel flow measurements are available. This method also linearly combines measurements in order to form a blended performance function but updates the weights as the aircraft formation evolves in time. This requires real-time estimates of the performance functions' shape. The method assumes that the mappings L, M, N, and F can be approximated as elliptic paraboloids;

$$L=\tfrac{1}{2}X^T A_L X + X^T b_L$$

$$M=\tfrac{1}{2}X^T A_M X + X^T b_M$$

$$N=\tfrac{1}{2}X^T A_N X + X^T b_N$$

$$F=\tfrac{1}{2}X^T A_F X + X^T b_F$$

However any other unimodal function could be used. Here F:X→F where F is fuel flow. The values of A(•) and b(•) may be found with a time-varying Kalman filter as presented in J. J. Ryan and J. L. Speyer, "Peak-Seeking Control Using Gradient And Hessian Estimates" in Proceedings of the American Control Conference. Baltimore, Md.: ACC, June 2010, pp. 611-616. The subscripts of A and b indicate the measurement to which each is associated. As the 10-1 . . . n formation evolves in time, periodic fuel-flow measurements are made which require a dwell-time in order to obtain steady-state measurements. The values of $A_F$ and $b_F$ are then updated and $\dot\omega$ recalculated as in Equation (2).

In between fuel flow measurements, L, M, and N measurements, which do not require a dwell-time, continue to be made and A(•) and b(•) are updated as described in Ryan et al, supra. The blended performance function B is updated according to equation 1 and the extremum-seeking control system guides the formation to the optimal relative position.

It must be assured that B remains convex during updates. If it does not remain convex, the extremum seeking control may drive the system away from the optimal location. A non-negative weighted sum of convex functions is also convex. The assumption of a quadratic form therefore ensures B will remain convex as long as each elemental function is convex. This is easily enforced by checking the Hessian A(•).

It must also be assured that the extremal position of B can be estimated with the elemental functions. With the quadratic implementation, the blended function of equation (1) is written as:

$$B=\Sigma\dot\omega(\tfrac{1}{2}X^T A_i X + X^T b_i + c_i), \text{ where } \Sigma \text{ is integrated from } i=1 \text{ to } 3$$

Here i ranges the measurement performance functions L, M, and N. The extremum coordinate of 13 is easily determined to be:

$$X_B^* = \left[\sum_{i=1}^{3} w_i A_i\right]^{-1} \sum_{i=1}^{3} w_i b_i \quad (4)$$

Using the fact that for each contributing elliptical paraboloid, $$X^*_i = -A_i^{-1} b_i$$

equation (4) is written as $$X_B^* = \left[\sum_{i=1}^{3} w_i A_i\right]^{-1} \sum_{i=1}^{3} w_i A_i X_i^*.$$

That is, $X^*_B$ is the weighted mean of the set of $X^*_i$ with the weights determined by wiAi. Clearly the extremum coordinates of D can then be approximated with other functions. Of course the contributing functions must be chosen such that the properties of a weighted mean is satisfied such as boundedness $$\min X^*i < X^* < \max X^*i.$$

This means the extremum coordinates of the contributing functions must surround that of D. This method was also applied to the flight experiment data described above.

FIG. 5 is a composite graph of fuel flow performance function, blended performance function, and the extremal locations of fuel flow, rolling moment, pitching moment, and yawing moment: FIG. 5(a) depicts the blended surface; FIG. 5(b) depicts the extrema locations of the drag-reduction, rolling-moment, pitching-moment, yawing-moment, and blended performance functions; FIG. 5(c) depicts pitching moment performance function; and FIG. 5(d) depicts yawing moment performance function.

Figure 6:
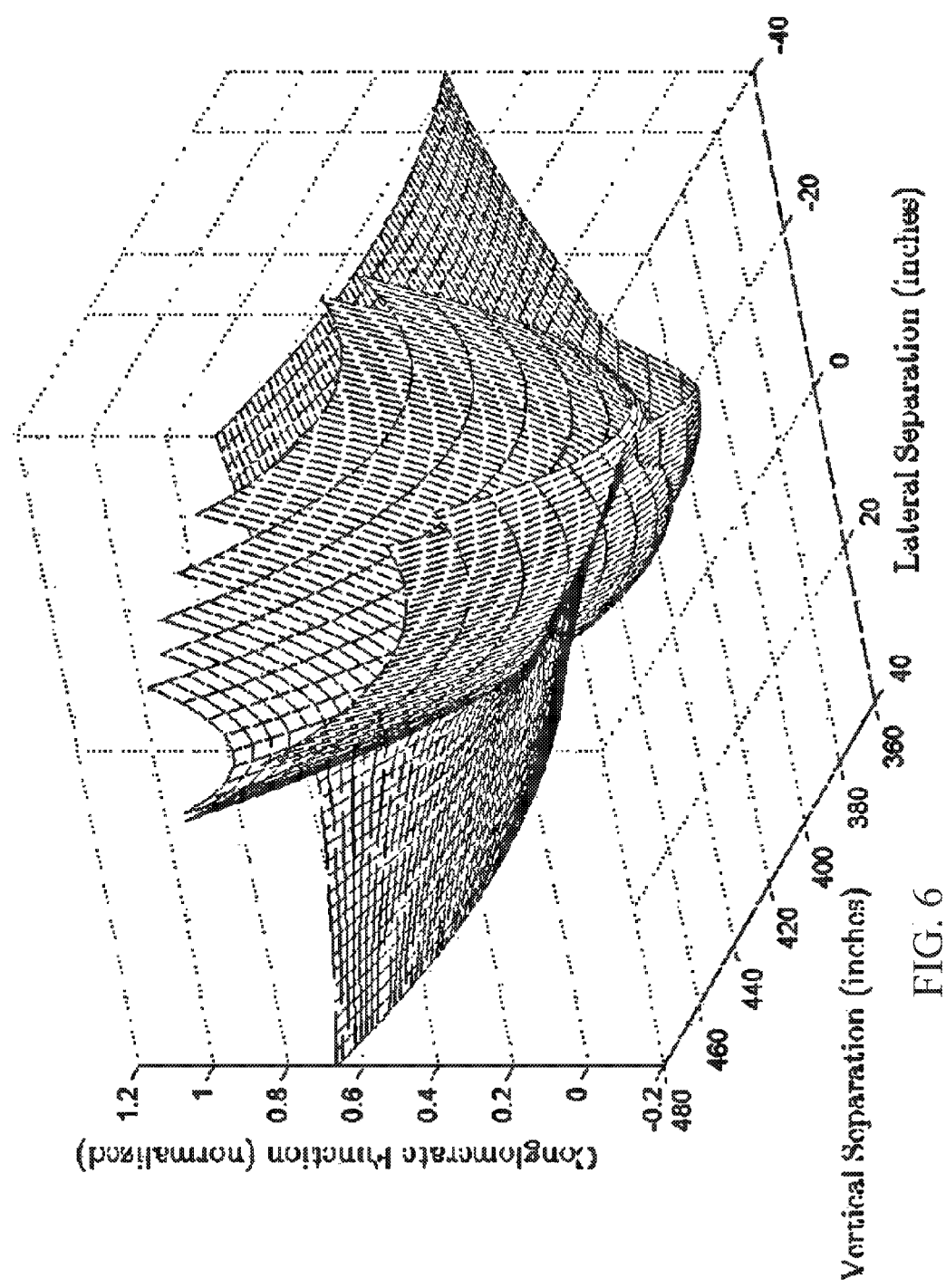
FIG. 6 indicates the blended performance function matches the shape of the fuel flow performance function in the area around the extremum.

FIG. 6 indicates the blended performance function matches the shape of the fuel flow performance function in the area around the extremum.

Figure 7:
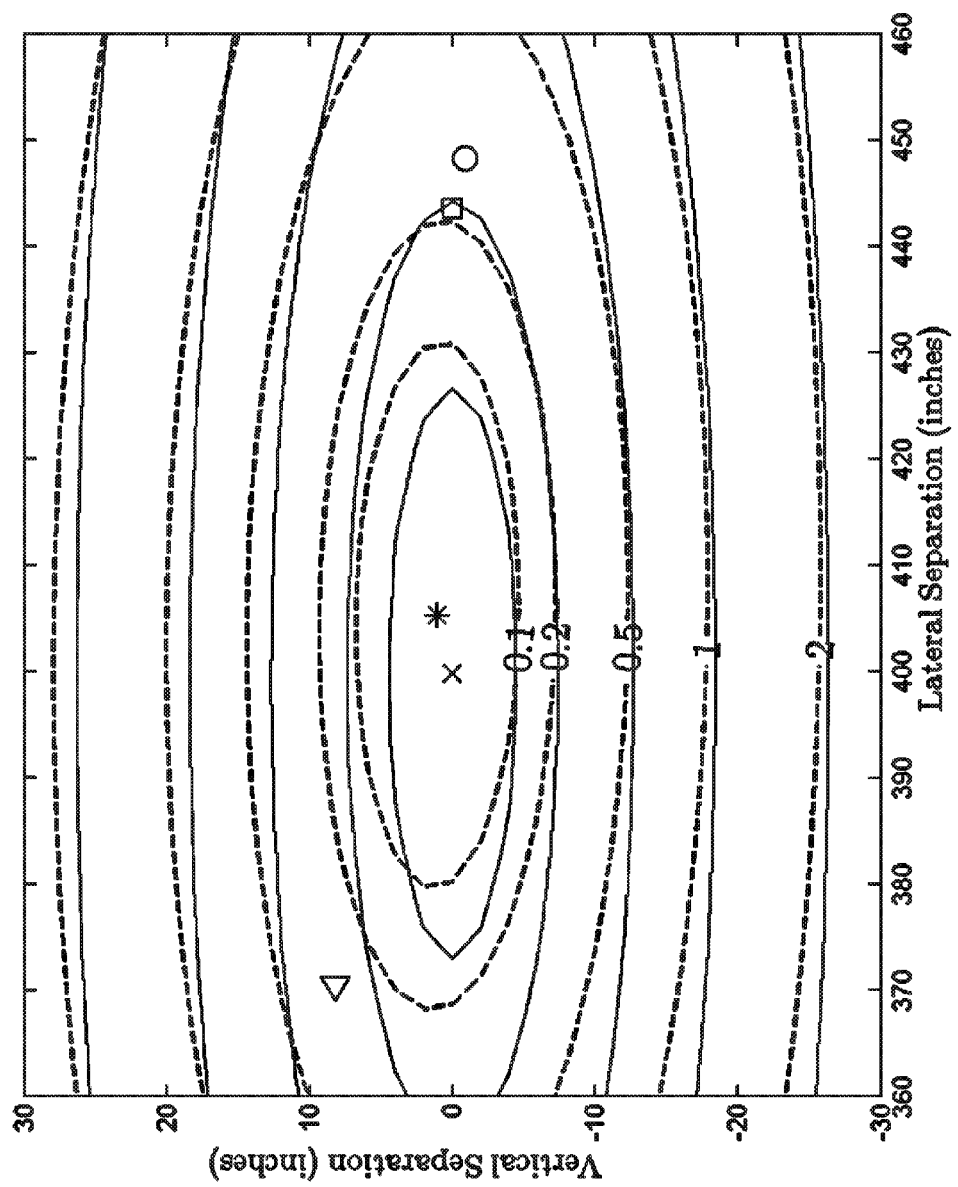
FIG. 7 indicates that the extremum of the blended performance function more closely matches that of fuel flow than the other individual parameters.

FIG. 7 indicates that the extremum of the blended performance function more closely matches that of fuel flow than the other individual parameters.

The main limitation of this method is the requirement of a dwell-time for fuel flow measurements. This slows the convergence of the extremum-seeking control system. A second limitation is the increased computational burden over the first method. Kalman filters are required to estimate the shape of each elemental function at each time step and the fuel flow function after each fuel flow measurement; however, modern flight control computers should be able to handle this increased computational need.

It should now be apparent that two methods of constructing performance functions for formation-flight-for-drag-reduction have been presented and illustrated with examples. Both combine readily available measurements to form a blended performance function which approximates that of drag reduction. The first method uses a priori measurements to determine a weighting vector which is applied to real-time measurements in forming the performance function. The second method periodically updates the weighting vector by fitting elemental functions to measurements of fuel-flow. Both methods are illustrated with an example and show better correlation to drag reduction than single parameter performance.

It should be understood that various changes may be made in the form, details, arrangement and proportions of the components. Such changes do not depart from the scope of the invention which comprises the matter shown and described herein and set forth in the appended claims.

The invention claimed is:

1. A method for formation flight control of aircraft using an extremum-seeking computer controller in communication with at least two different aircraft flight sensors, the method comprising the computer controller performing the steps of:
    deriving a first performance function for flight formation of said aircraft as a function of a first aircraft performance parameter;
    deriving a second performance function for flight formation of said aircraft as a function of a second aircraft performance parameter;
    deriving a conglomerate performance function for flight formation of an aircraft as a linear combination of said first performance function multiplied by a first weight vector plus said second performance function multiplied by a second weight vector;
    optimizing the conglomerate performance function by optimizing the first weight vector and second weight vector using a pre-existing data set;
    monitoring a realtime operating state of the aircraft using a first sensor to measure said first aircraft performance parameter and storing a first chronological sequence of measurements from said first sensor;
    monitoring a realtime operating state of the aircraft using a second sensor to measure said second aircraft performance parameter and storing a second chronological sequence of measurements from said second sensor;
    adding the first weighted sequence of measurements and the second weighted sequence of measurements to an input of an integrator of an extremum seeking controller to optimize said conglomerate performance function for flight formation of said aircraft; and,
    employing said optimized conglomerate performance function to optimize formation flight of said aircraft.

2. The method of claim 1, wherein in the extremum seeking controller includes a performance function for minimizing drag to said aircraft.

3. The method of claim 2, wherein said step of determining a first weighting vector comprises quantitatively determining weights from historical data comprising any one or more aircraft performance parameters.

4. The method of claim 3, wherein said aircraft performance parameters are chosen from the group consisting of rolling-moment, pitching-moment, yawing-moment, power-lever angle, and fuel consumption.

5. The method of claim 3, wherein said step of determining a first weighting vector for said first aircraft performance parameters comprises a priori minimization of error between a conglomerate function and a known drag reduction function.

6. The method of claim 5, wherein said step of determining said second weighting vector comprises minimizing error between a conglomerate function and a known drag reduction function.

7. The method of claim 2, wherein said step of determining a second weighting vector for said second aircraft performance parameters comprises quantitatively determining weights based on any one or more aircraft performance parameters chosen from the group consisting of rolling-moment, pitching-moment, yawing-moment, power-lever angle, and fuel consumption.

8. The method of claim 2, wherein said step of determining said second weighting vector comprises optimization using a generalized least squares approach to form a linear combination of the measurements.

9. The method of claim 1, further comprising a step of monitoring a third operating state of the aircraft and storing a third chronological sequence of measurements, a step of determining a third weighting vector for said third aircraft performance parameters; and adding the first weighted sequence of measurements, second weighted sequence of measurements and third weighted sequence of measurements to an input of an integrator of the extremum seeking controller.

10. The method of claim 1, further comprising a step of ex post facto optimizing the conglomerate performance function by optimizing the first weight vector and second weight vector using realtime data.

11. The method of claim 10, further comprising periodically updating the first weight vector and second weight vector using realtime data.

12. A computerized method of extremum-seeking control system for formation flight comprising the steps of:

monitoring at least two different aircraft performance parameters and accumulating time-based measurement sequences therefrom;

combining the time-based measurement sequences from said at least two different aircraft performance parameters into a blended conglomerate performance function;

weighting the time-based measurement sequences from said at least two different aircraft performance parameters in said blended conglomerate performance function; and optimizing said performance function to minimize drag to said aircraft.

13. A system for extremum-seeking control for formation flight to approximate drag reduction comprising:

a radar system;

at least one altitude encoder, a three-axis gyroscope for measuring rolling-moment, pitching-moment, and yawing-moment;

a Universal Access Transceiver (UAT) for compiling ownship ADS-B Out messages and for receiving air-to-air ADS-B In messages from nearby aircraft;

a flight control computer in communication with said UAT, said flight control computer comprising non-transitory storage media storing computer instructions for implementing the steps of, inputting realtime measurements of at least two parameters chosen from the group of rolling-moment, pitching-moment, yawing-moment, power-lever angle, and fuel consumption;

approximating a shape of a conglomerate drag reduction function from said inputted measurements;

calculating relative weightings and weighting the measurements by minimizing error of said conglomerate drag reduction function;

applying a least squares analysis to form a linear function of the measurements to optimize the conglomerate drag reduction function; and, employing said optimized conglomerate drag reduction function to reduce the drag of said aircraft.

14. A method for extremum-seeking control for formation flight to approximate drag reduction, comprising the steps of:

inputting realtime measurements of at least two parameters chosen from the group of rolling-moment, pitching-moment, yawing-moment, power-lever angle, and fuel consumption;

approximating a shape of a conglomerate drag reduction function from said inputted measurements;

calculating relative weightings and weighting the measurements by minimizing error of said conglomerate drag reduction function;

applying a least squares analysis to form a linear function of the measurements to optimize the conglomerate drag reduction function; and, employing said optimized conglomerate drag reduction function to reduce drag of said aircraft.

* * * * *